US007927202B2

(12) United States Patent   (10) Patent No.: US 7,927,202 B2
Kanemori et al.   (45) Date of Patent: Apr. 19, 2011

(54) VIDEO GAME PROCESSING APPARATUS, A METHOD AND A COMPUTER PROGRAM PRODUCT FOR PROCESSING A VIDEO GAME

(75) Inventors: Yuichi Kanemori, Tokyo (JP); Yosuke Shiokawa, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 187 days.

(21) Appl. No.: 11/460,747

(22) Filed: Jul. 28, 2006

(65) Prior Publication Data

US 2007/0155501 A1   Jul. 5, 2007

(30) Foreign Application Priority Data

Dec. 21, 2005 (JP) ................ P2005-368707

(51) Int. Cl.
*A63F 9/24* (2006.01)
*A63F 13/00* (2006.01)
(52) U.S. Cl. ........... 463/1; 463/9; 463/30; 463/31
(58) Field of Classification Search ............ 463/1, 31, 463/9, 30
See application file for complete search history.

(56) References Cited

U.S. PATENT DOCUMENTS

| 5,396,264 | A | * | 3/1995 | Falcone et al. ............ 715/811 |
| 5,598,522 | A | * | 1/1997 | Inatomi .................... 715/821 |
| 6,095,949 | A | * | 8/2000 | Arai ............................ 482/4 |
| 6,807,521 | B1 | | 10/2004 | Kurosawa et al. |

FOREIGN PATENT DOCUMENTS

JP   2003-079941   3/2003

OTHER PUBLICATIONS

Fable game manual released for Microsoft Xbox on Sep. 14, 2004, pp. 1-24, (18 total scanned pages).*
The legend of Zelda, A link to the past, past is a game manual released on the Super Nintendo Entertainment System, released in Apr. 1992, pp. 15-16.*
Fable Images; received from http://www.gamespot.com/xbox/rpg.fable/images.html?tag=tabs;images; game released on Sep. 14, 2004, screen shots added on Sep. 2, 2004; pp. 1-8.*
"Dengeki PlayStation, vol. 9, No. 30 (Neon Genesis Evangelion 2)", Media Works, Nov. 28, 2003, vol. 9, No. 30, pp. 176-183, and an English language partial translation of the same.

(Continued)

*Primary Examiner* — Melba Bumgarner
*Assistant Examiner* — Jasson H Yoo
(74) *Attorney, Agent, or Firm* — Greenblum & Bernstein, P.L.C.

(57) ABSTRACT

It is an object that a normally selectable command or a command for specifying an appropriate action in accordance with the state of a player character can be easily selected through a simple operation by a player. In a command control process, at least one normal action specifying command for specifying a normal action that the player character can normally carry out is selectably displayed; at least one local action specifying command for specifying a local action that the player character can locally carry out in accordance with a state of the player character and corresponds to the state of the player character is selectably displayed when the player character becomes the corresponding state; and an action of the player character is controlled in response to the command selected, through operation by the player, from the displayed at least one normal action specifying command and the displayed at least one local action specifying command.

20 Claims, 9 Drawing Sheets

PRIORITY SETTING TABLE

| PRIORITY | TARGET COMMAND |
|---|---|
| PRIORITY A | COMMAND 1, COMMAND 3, COMMAND 7 ··· |
| PRIORITY B | COMMAND 2, COMMAND 5, COMMAND 9 ··· |
| PRIORITY C | COMMAND 4, COMMAND 6, COMMAND 8 ··· |
| ⋮ | ⋮ |

OTHER PUBLICATIONS

"Dengeki Gamecube, vol. 3, No. 10 (Final Fantasy, Crystal Chronicle)", Media Works, Sep. 1, 2003, vol. 3, No. 10, p. 20, and an English language partial translation of the same.

"Dengeki Gamecube, vol. 4, No. 2 (Rogue Ops)", Media Works, Feb. 1, 2004, vol. 4, No. 2, p. 88, and an English language partial translation of the same.

English Language Abstract of JP 2003-079941.

U.S. Appl. No. 11/432,512 to Yasui et al. filed May 12, 2006.

A partial English language translation of Japanese Unexamined Patent Publication No. 2003-079941.

Famitsu PS2, Enterbrain, Inc., Dec. 23, 2005, vol. 10, No. 24, p. 21 (circulated on Dec. 9, 2005), together with a partial English language translation of the same.

"V Jump," Shueisha, Inc., Feb. 1, 2006, vol. 14, No. 2, appendix, p. 4 (circulated on Dec. 17, 2005), together with a partial English language translation of the same.

"Hyper Playstation2," Sony Magazines, Inc., Jan. 1, 2006, vol. 12, No. 1, p. 35 (circulated on Nov. 30, 2005), together with a partial English language translation of the same.

"Famitsu PS2," Enterbrain, Inc., Nov. 11, 2005, vol. 10, No. 21, p. 37 (circulated on Oct. 28, 2005), together with a partial English language translation of the same.

"Weekly Famitsu," Enterbrain, Inc., Dec. 30, 2005, vol. 20, No. 52, p. 29 (circulated on Dec. 16, 2005), together with a partial English language translation of the same.

"Dorimaga," Softbank Publishing, Inc., Oct. 1, 2005, vol. 22, No. 10, p. 11 (circulated on Aug. 30, 2005), together with a partial English language translation of the same.

"Dorimaga," Softbank Publishing, Inc., Dec. 1, 2005, vol. 22, No. 12, p. 14 (circulated on Oct. 29, 2005), together with a partial English language translation of the same.

"Dorimaga," Softbank Publishing, Inc., Jan. 1, 2006, vol. 23, No. 1, p. 10 (circulated on Nov. 30, 2005), together with a partial English language translation of the same.

"Dorimaga, Extra number of Sep. 2005 Issue, Experience," Softbank Publishing, Inc., Sep. 1, 2005, No. 1, p. 48 (circulated on Jul. 29, 2005), together with a partial English language translation of the same.

\* cited by examiner

FIG. 4

DISPLAY ALLOWABLE CONDITIONS SETTING TABLE

| LOCAL ACTION SPECIFYING COMMAND | DISPLAY ALLOWABLE CONDITIONS |
|---|---|
| COMMAND 1 (TALK) | ACTION TARGET (SUCH AS VILLAGER) IS WITHIN DISTANCE A FROM PLAYER CHARACTER |
| COMMAND 2 (READ) | ACTION TARGET (SUCH AS SIGNBOARD) IS WITHIN DISTANCE B FROM PLAYER CHARACTER |
| COMMAND 3 (HOLD) | ACTION TARGET (SUCH AS BOX) IS WITHIN DISTANCE C FROM PLAYER CHARACTER |
| COMMAND 4 (THROW) | ACTION TARGET (SUCH AS BOX) IS HELD BY PLAYER CHARACTER |
| COMMAND 5 (OPEN) | ACTION TARGET (SUCH AS TREASURE BOX) IS WITHIN DISTANCE D FROM PLAYER CHARACTER |
| ⋮ | ⋮ |

FIG. 5

PRIORITY SETTING TABLE

| PRIORITY | TARGET COMMAND |
|---|---|
| PRIORITY A | COMMAND 1, COMMAND 3, COMMAND 7 ⋯ |
| PRIORITY B | COMMAND 2, COMMAND 5, COMMAND 9 ⋯ |
| PRIORITY C | COMMAND 4, COMMAND 6, COMMAND 8 ⋯ |
| ⋮ | ⋮ |

VIDEO GAME PROCESSING APPARATUS, A METHOD AND A COMPUTER PROGRAM PRODUCT FOR PROCESSING A VIDEO GAME

CROSS-REFERENCE TO RELATED APPLICATION

The present disclosure relates to subject matter contained in Japanese Patent Application No. 2005-368707, filed on Dec. 21, 2005, the disclosure of which is expressly incorporated herein by reference in its entirety.

BACKGROUND OF THE INVENTION

1. Field of the Invention

The present invention relates to a technique to control progress of a video game by displaying a player character on an image display screen of an image display apparatus and controlling an action of the player character displayed on the image display screen in response to an operation(s) by a player.

2. Description of the Related Art

Heretofore, various kinds of so-called role playing games (RPG; that is, a game in which a player plays a role of a character in a world of the game, and accomplishes a predetermined object while enjoying a process that the character grows through various experiences) have been provided.

In a RPG, generally, a player character acting in response to an operation by the player wins a battle against an enemy character thwarting accomplishment of a predetermined object in the RPG, by which various benefits such as an experiential value are supplied to the player character.

In a video game such as a RPG, for example, the video game proceeds by displaying a command that, when selected, causes a player character to carry out a predetermined action. Then, after the player has selected a command, the video game causes the player character to carry out the predetermined action in accordance with the command selected through an operation by the player.

Here, as one method of causing the player character to carry out various actions in accordance with an operation by the player, there is a method in which combinations of operations of multiple keys are used to cause respective actions by the player character complex. However, in order to carry out such actions correctly, the player must currently memorize multiple combinations of operations of multiple keys. It is difficult for, in particular, a user that plays the game less frequently (light user) to carry out an action as intended.

In order to solve this problem, it has been proposed by the present applicant that a command displayed as a selectable command be changed in accordance with a state of a player character (see, for example, Japanese Patent Application Publication No. 2003-79941).

In the technique described above, although an appropriate action can be specified in accordance with the state of the player character, there is a possibility that the player cannot select the appropriate command because the command displayed as a selectable command may be changed.

On the other hand, in the case where an appropriate command is to be selectably displayed in accordance with the state of the player character, and a command to be normally selectable is selectably displayed, a command selecting operation by the player becomes complicated.

SUMMARY OF THE INVENTION

It is one object of the present invention to solve the problems described above and to provide a video game processing apparatus, a method and a computer program product for processing a video game by which it is possible to easily select a normally selectable command or a command for specifying an appropriate action in accordance with the state of a player character through simple operations by a player.

In order to achieve the above object, in one aspect of the present invention, the present invention is directed to a video game processing apparatus that causes an image display apparatus to display a player character of a video game on an image screen of the image display apparatus. The video game processing apparatus (for example, a video game apparatus main body 10 and a video game apparatus 100) controls progress of the video game by controlling an action of the player character displayed on the image screen in accordance with operations by a player. The video game processing apparatus of the present invention includes a normal action specifying command display controller that selectably displays at least one normal action specifying command for specifying a normal action that the player character can normally carry out (for example, a process at Step S121 executed by a control section 11).

The video game processing apparatus also includes a local action specifying command display controller that selectably displays at least one local action specifying command for specifying a local action that the player character can locally carry out in accordance with a state of the player character (for example, a process at Step S126 executed by the control section 11).

The video game processing apparatus also includes a command selection receiver that receives a command selected, by an operation of the player, from one of the at least one normal action specifying command displayed by the normal action specifying command display controller, and the at least one local action specifying command displayed by the local action specifying command display controller (for example, processes at Steps S104, S108 and S111 executed by the control section 11).

The video game processing apparatus also includes a player character action controller that controls an action of the player character in response to the command received by the command selection receiver (for example, processes at Steps S128, S129, S132 and S133 executed by the control section 11).

In this case, the at least one local action specifying command corresponds to the state of the player character (for example, a state that the display allowable conditions indicates) (see, for example, FIG. 4), and the local action specifying command display controller selectably displays the at least one local action specifying command when the player character becomes (enters) the corresponding state (for example, Steps S122 and S126).

Since the video game processing apparatus may have a configuration as described above, it is possible to easily select, through simple operations by a player, a normal action specifying command that is normally selectable or a local action specifying command for specifying an appropriate action in accordance with the state of the player character.

It is preferable that the at least one local action specifying command includes multiple categories of local action specifying commands that respectively correspond to the states of the player character. It is also preferable that the local action specifying command display controller displays a local action specifying command to which a current state of the player character corresponds from the multiple categories of local action specifying commands. Since the video game processing apparatus may have the configuration described above, it is possible to easily select a local action specifying command for specifying an appropriate action in accordance with the state of the player character.

It is preferable that the video game processing apparatus of the present invention also causes the image display apparatus display at least one other character of the video game on the image screen of the image display apparatus, and the at least one character may be a target character of at least one of a normal action and a local action. In this case, the multiple categories of local action specifying commands may respectively correspond to the categories of target characters each of which is to be a target of the local action of the player character. Further, the multiple categories of local action specifying commands may respectively correspond to the categories of the states of the player character.

It is preferable that a degree of display priority is set to each of the multiple categories of local action specifying commands, and the local action specifying command display controller selectably displays a local action specifying command having a highest degree of display priority in the case where there is at least two local action specifying commands that correspond to the current state of the player character. Since the video game processing apparatus may have the configuration as described above, it is possible to easily select a local action specifying command for specifying an appropriate action in accordance with the state of the player character.

It is preferable that the video game processing apparatus further includes a normal action target identifying display controller that distinguishably displays identification of a normal action target character. The normal action target character is a target of the normal action of the player character in the case where the normal action specifying command for specifying the normal action, which is selectably displayed by the normal action specifying command display controller, is selected. In this case, in the case where two or more local action specifying commands correspond to the current state of the player character, the local action specifying command display controller selectably displays the local action specifying command that specifies the local action (for example, a special attack) whose target is the normal action target character (an enemy character locked as an attack target character), identification of which the normal action target identifying display controller displays, in priority to any other local action specifying command. Since the video game processing apparatus may have the configuration described above, it is possible to easily select a local action specifying command for specifying an appropriate action in accordance with the state of the player character.

It is preferable that the video game processing apparatus further includes a local action target identifying display controller (for example, a process at Step S127 executed by the control section 11) that distinguishably displays identification of a local action target character (for example, identification of an action target) that is a target of the local action of the player character in the case where the at least one local action specifying command for specifying the local action, which is selectably displayed by the local action specifying command display controller, is selected. Since the video game processing apparatus may have the configuration described above, it is possible to easily identify a local action target character that is a target of the action of the player character.

It is preferable that the video game processing apparatus further includes: a normal action target identifying display controller that distinguishably displays identification of a normal action target character that is a target of the normal action of the player character in the case where the at least one normal action specifying command for specifying the normal action, which is selectably displayed by the normal action specifying command display controller, is selected; and a target character change controller that causes the local action target characters, whose identification is to be displayed by the local action target identifying display controller, to change. In this case, in the case where the player character becomes a state that corresponds to a predetermined local action specifying command, the target character change controller changes the local action target character, which is a target of the local action of the player character when the predetermined local action specifying command (for example, a local action specifying command such as "throw" and "special attack"), is selected, to the normal action target character, identification of which is displayed by the normal action target identifying display controller. Since the video game processing apparatus may have the configuration described above, it is possible to change the action target character to an appropriate action target character to cause the player character to carry out an appropriate action in accordance with the state of the player character.

It is preferable that the state of the player character that corresponds to the at least one local action specifying command includes, for example, a state that a distance between the player character and the target character that is a target of the local action of the player character is within a predetermined distance.

It is preferable that the video game processing apparatus further includes an operation signal output controller (for example, a keypad 30) that outputs operation signals including a first operation signal (for example, an operation signal on the basis of press of a circle button) and a second operation signal (for example, an operation signal on the basis of press of a triangle button), which is different from the first operation signal, to the command selection receiver in accordance with an operation by the player. In this case, the command selection receiver receives selection of the at least one normal action specifying command in response to an output of the first operation signal from the operation signal output controller, and receives selection of the at least one local action specifying command in response to an output of the second operation signal from the operation signal output controller. Since the video game processing apparatus may have the configuration described above, it is possible to carry out, through a simple operation by a player, selection of a normal action specifying command that is normally selectable or selection of a local action specifying command for specifying an appropriate action in accordance with the state of the player character.

Further, in another aspect of the present invention, the present invention is directed to a method of processing a video game by causing an image display apparatus to display a player character of a video game on an image screen of the image display apparatus. In this case, the method controls progress of the video game by controlling an action of the player character displayed on the image screen in accordance with operations by a player. The method of the present invention includes selectably displaying at least one normal action specifying command for specifying a normal action that the player character can normally carry out.

The method also includes selectably displaying at least one local action specifying command for specifying a local action that the player character can locally carry out in accordance with a state of the player character and corresponds to the state of the player character, when the player character becomes the corresponding state.

The method also includes receiving a command selected, through an operation by the player, from one of the at least one displayed normal action specifying command and the at least one displayed local action specifying command.

The method also includes controlling an action of the player character in response to the received command.

Moreover, in still another aspect of the present invention, the present invention is directed to a computer program product for processing a video game. Progress of the video game is controlled by causing an image display apparatus to display a player character of a video game on an image screen of the image display apparatus, and controlling an action of the player character displayed on the image screen in accordance with operations by a player. The computer program product causes a computer to execute steps including selectably displaying at least one normal action specifying command for specifying a normal action that the player character can normally carry out.

The steps also include selectably displaying at least one local action specifying command for specifying a local action that the player character can locally carry out in accordance with a state of the player character and corresponds to the state of the player character, when the player character becomes (enters) the corresponding state.

The steps also include receiving the command selected, through operation by the player, from one of the at least one displayed normal action specifying command and the at least one displayed local action specifying command.

The steps also include controlling an action of the player character in response to the received command.

According to the present invention, it is possible to easily select, through simple operation by a player, a normal action specifying command that is normally selectable or a local action specifying command for specifying an appropriate action in accordance with the state of the player character.

BRIEF DESCRIPTION OF THE DRAWINGS

The foregoing and other objects, features and advantages of the present invention will become more readily apparent from the following detailed description of preferred embodiments of the present invention that proceeds with reference to the appending drawings.

FIG. 4 is an explanatory drawing that shows an example of a display allowable conditions setting table.

FIG. 5 is an explanatory drawing that shows an example of a priority setting table.

DETAILED DESCRIPTION OF THE INVENTION

Preferred embodiments of a video game processing apparatus, a method and a computer program product for processing a video game according to the present invention will now be described in detail with reference to the appending drawings.

Figure 1:
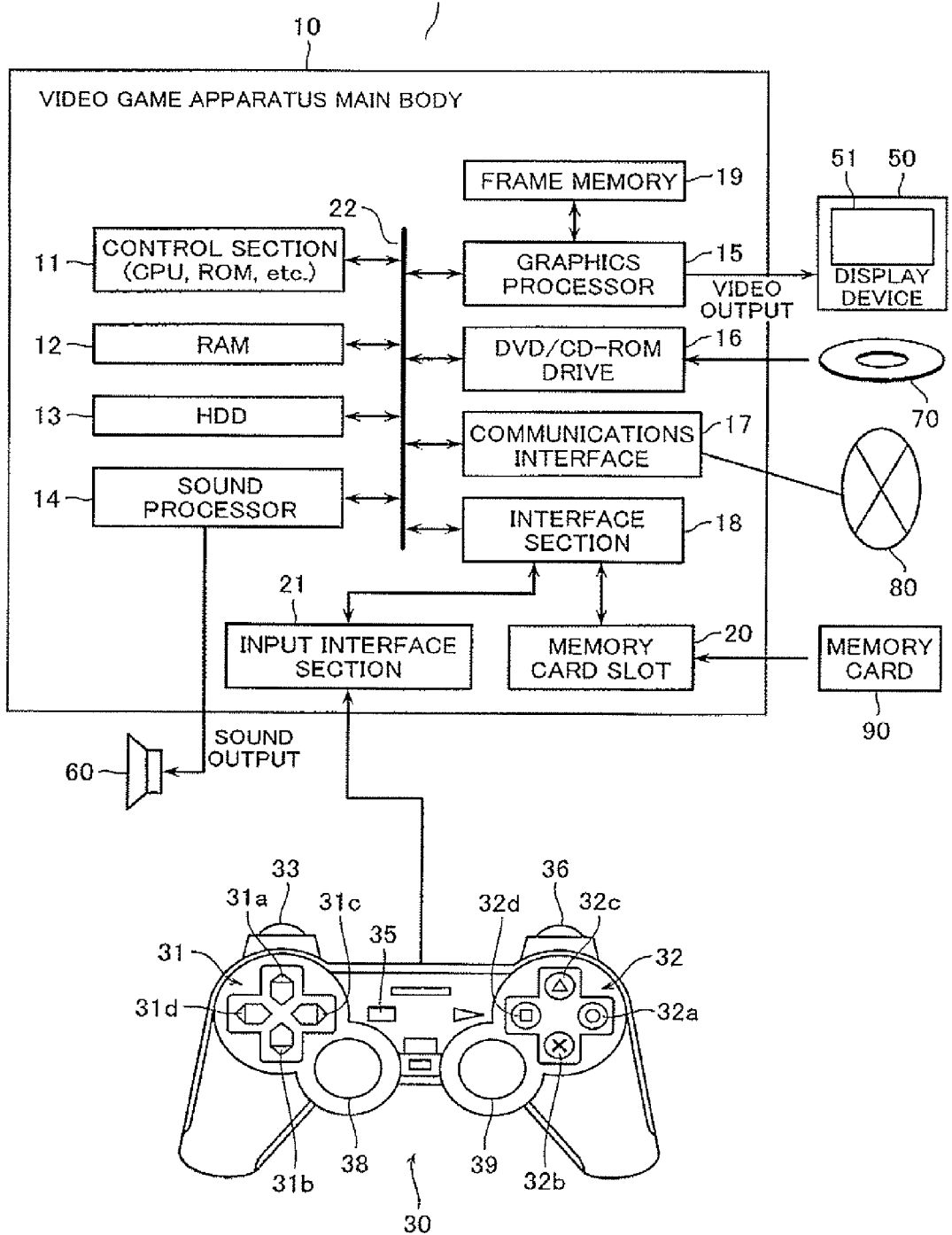
FIG. 1 is a block diagram that illustrates an example of a configuration of a video game apparatus to which an embodiment of the present invention is applied.

FIG. 1 is a block diagram that illustrates a configuration of a video game apparatus 100 to which an embodiment of the present invention is applied. However, those skilled in the art will readily recognize that other devices may be used without departing from the spirit or scope of the invention.

As shown in FIG. 1, a video game apparatus 100 of this embodiment includes a video game apparatus main body 10, a display device 50, and a sound output device 60. The video game apparatus main body 10 is constituted from a video game system that is put on the market, for example. Further, the display device 50 is constituted from, for example, a television apparatus, a liquid crystal display device, a micromirror device, a holographic display device, or any combination thereof. The display device 50 is provided with an image display screen 51. However, those skilled in the art will readily recognize that any device capable of generating or reproducing an image may be used without departing from the scope or spirit of the invention.

The video game apparatus main body 10 includes a control section 11, a RAM (Random Access Memory) 12, a HDD (hard disk drive) 13, a sound processor 14, a graphics processor 15, a DVD/CD-ROM drive 16, a communications interface 17, an interface section 18, a frame memory 19, a memory card slot 20, and an input interface section 21.

Each of the control section 11, the RAM (Random Access Memory) 12, the HDD (Hard Disc Drive) 13, the sound processor 14, the graphics processor 15, the DVD/CD-ROM drive 16, the communications interface 17 and the interface section 18 is connected to an internal bus 22.

The control section 11 includes a CPU (Central Processing Unit), ROM (Read Only Memory) and the like, and carries out control of the whole video game apparatus 100 in accordance with control programs stored in the HDD 13 and/or a storage medium 70. The control section 11 has an internal timer used to generate timer interruption. The RAM 12 is used as a work area for the control section 11. The HDD 13 is a storage region for storing the control programs and various data.

The sound processor 14 is connected to the sound output device 60, which includes a speaker, for example, but may include any other device capable of generating or reproducing an audible signal. The sound processor 14 outputs a sound signal to the sound output device 60 in accordance with a sound outputting command from the control section 11 that carries out a process according to the control programs. In this regard, the sound output device 60 may be embedded in the display device 50 or the video game apparatus main body 10, or may be affixed to a vibrating surface that may be caused to generate the audible signal.

The graphics processor 15 is connected to the display device 50 including the image display screen 51 on which an image is displayed. However, those skilled in the art will readily recognize that the graphics processor may be coupled to other known types of display devices, such as a head-mounted display, a holographic three-dimensional display or the like, without departing from the spirit or scope of the invention. The graphics processor 15 develops an image on the frame memory 19 in accordance with a drawing or graphics from the control section 11, and outputs video signals for displaying the image on the image display screen 51 to the display device 50. A switching time for images to be displayed according to the video signals is set to 1/30 seconds per frame (for NTSC type displays), for example. However, the switching time may be any other frame rate (for example, 1/25 second per frame (for PAL type displays)) as those skilled in the art will appreciate without departing from the spirit or scope of the invention.

A storage medium 70 such as a DVD-ROM medium or a CD-ROM medium, or equivalent, in which control programs for a game are stored is mounted in the DVD/CD-ROM drive 16. The DVD/CD-ROM drive 16 carries out a process for reading out various data such as control programs from the storage medium 70.

The communications interface 17 is connected to a communication network 80 such as the Internet, a local area network (LAN), a wide area network (WAN), or the like, in a wireless or wired manner. The video game apparatus main body 10 carries out communication with, for example, another computer via the communication network 80 using a communication function of the communications interface 17.

Each of the input section 21 and the memory card slot 20 is connected to the interface section 18. The interface section 18 causes the RAM 12 to store instruction data from the input section 21 on the basis of operation(s) of the input section 21 by a player of the video game apparatus 100. In response to the instruction data stored in the RAM 12, the control section 11 carries out various arithmetic processing.

The video game apparatus main body 10 is connected to a controller device such as a keypad 30 as an operation input section (controller) via the input interface section 21. However, other types of controllers may be used without departing from the scope or spirit of the invention.

As shown in FIG. 1, for example, a cross key 31, a group of buttons 32, a left joystick 38 and a right joystick 39 are arranged on the upper surface of the keypad 30. The cross key 31 includes an upper key 31a, a lower key 31b, a right key 31c and a left key 31d, and the group of buttons 32 includes a circle button 32a, an X key 32b, a triangle key 32c and a square key 32d. Further, a select button 35 is arranged at a connecting portion between a base on which the cross key 31 is arranged and a base on which the group of buttons 32 are arranged. In addition, multiple buttons such as an R1 button 36 and an L1 button 33 are arranged at the side surface of the keypad 30.

The keypad 30 is provided with multiple switches respectively connected to the cross key 31, the circle button 32a, the X button 32b, the triangle button 32c, the square button 32d, the select button 35, the R1 button 36 and the L1 button 33. When pressing force is applied to any button, the corresponding switch is turned on. A detecting signal in accordance with on/off of the switch is generated in the keypad 30, and detecting signals are generated, respectively, corresponding to inclined directions of the left joystick 38 and the right joystick 39 in the keypad 30.

The two types of detecting signals generated in the keypad 30 are output to the control section 11 via the input interface section 21 (through wired or wireless connection), by which detecting information indicating that button on the keypad 30 is pressed and detecting information indicating the state of each of the left joystick 38 and the right joystick 39 are generated. In this way, operation instruction(s) by a user (player) using the keypad 30, for example, is supplied to the video game apparatus main body 10 (control section 11).

Further, the interface section 18 carries out, according to the command(s) from the control section 11, a process to store data indicative of the progress of the game stored in the RAM 12 into the memory card 90 installed in the memory card slot 20. The interface section 18 also carries out a process to read out data on the game stored in the memory card 90 at the time of suspending the game and to transfer such data to the RAM 12, or the like.

Various data such as control program data for performing the game with the video game apparatus 100 are stored in, for example, the storage medium 70. The various data such as the control program data stored in the storage medium 70 are read out by the DVD/CD-ROM drive 16 in which the storage medium 70 is installed, and the data thus read out are loaded onto the RAM 12. The control section 11 carries out, in accordance with the control program loaded on the RAM 12 various processes such as a process to output the drawing or graphics to the graphics processor 15, and a process to output the sound outputting command to the sound processor 14. In this regard, the interim data generated in response to the progress of the game (for example, data indicative of scoring of the game, the state of a player character and the like) are stored in the RAM 12 used as a work memory while the control section 11 carries out processing.

It is assumed that the three-dimensional video game according to the present embodiment is a game wherein multiple characters, including a player character (that is, a character that moves in accordance with the operation of the input section 21 by the player), move on a field provided in a virtual three-dimensional space, by which the game proceeds. In this regard, it is assumed that the virtual three-dimensional space in which the field is formed is indicated by coordinates of the world coordinate system. The field is defined by multiple surfaces, and coordinates of vertexes of the respective constituent surfaces are shown as characteristic points.

Next, an operation of the video game apparatus 100 according to the present embodiment will now be described.

Here, in order to simplify the explanation of the operation of the video game apparatus 100, it is assumed that only a single player character and multiple non-player characters (which are moved in accordance with control of the video game apparatus 100 (more specifically, control of the control section 11), and hereinafter, referred to simply as "NPC") exist as objects that are movable in the virtual three-dimensional space. However, the explanation for any process other than the processes relating to the present invention is omitted, in particular. In this regard, in the present embodiment, video game control for a RPG is carried out, but those skilled in the art will recognize and appreciate that changes to the invention can be made without departing from the scope or spirit of the invention.

Figure 2:
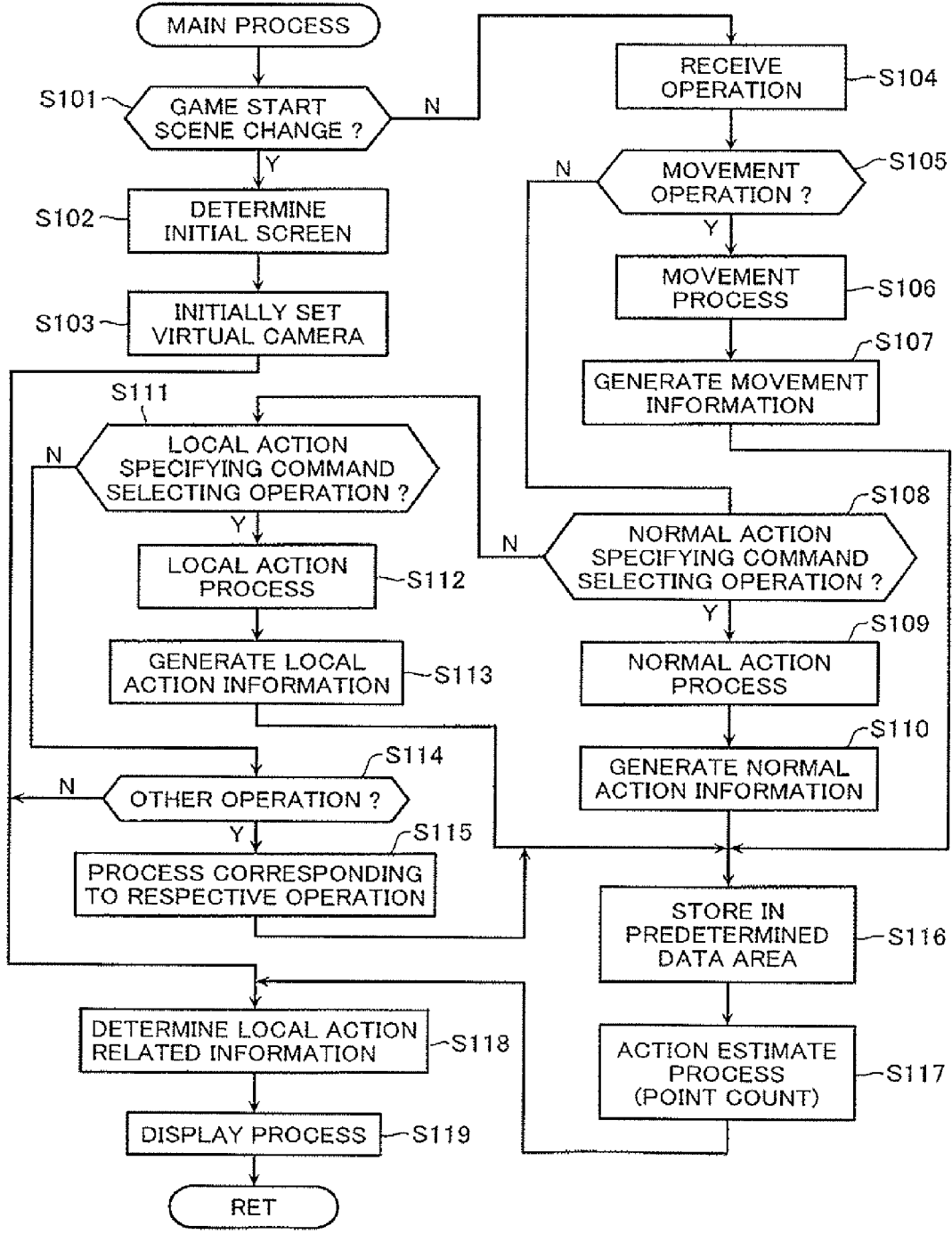
FIG. 2 is a flowchart that illustrates an example of a main process.

FIG. 2 is a flowchart that illustrates an example of a main process of the video game apparatus 100 according to the present embodiment. The main process is a process for generating an image for one frame and a process required for the control of the video game. The process is carried out in accordance with timer interruption at every 1/30 second. However, it is to be noted that timing of "at every 1/30 second" is only one example. Instead, for example, the main process may be carried out in accordance with timer interruption at every single field period (every 1/60 second) or at every two frame periods (every 1/15 second), or any other appropriate field rate that may be recognized by those skilled in the art to be appropriate without departing from the scope or spirit of the invention.

In the present embodiment, a game (that is, a RPG game) proceeds in a common field (that is, a single field where a battle field and a movement field are not distinguished from each other) in which various actions (such as a battle action and/or a movement action) including the movement of the player character and a battle by the player character are allowed. In the case where a predetermined object in the field is accomplished, one stage may be terminated and the processing may proceed to another stage carried out in a next field. Further, in the present embodiment, a same time base is applied to the respective characters existing in such a field. Once a NPC enters the stage in the field, the NPC moves on the field or stands still on the field in accordance with the same time base until a hit point (which is a value indicating life force, and hereinafter, referred to simply as "HP") thereof becomes zero. In this case, a portion displayed on the image display screen 51 as a character image is a portion that exists within the field of view of a virtual camera in the field.

In the main process, the control section 11 determines whether an instruction to start a game is generated through an operation of the input section 21, via manipulation of the controller 30 by the player or not in the case where the state is still before the game start. Alternatively, once the game has started or ins in progress, the control section 11 determines whether a timing state is reached to change the scene (for example, change the field) or not in the case where the state is during execution of the game (Step S101). The timing state to change the scene is, for example, the time at which a virtual three-dimensional space illustrating a new scene is displayed on the image display screen 51 in order to finish the scene that has been displayed on the image display screen 51 until that point (for example, a scene displayed by a virtual three-dimensional space, and a scene displayed by a directorial moving image) and to switch the displayed scene to the new scene.

In the case where it is determined that an instruction to start a game is generated or that the timing state reaches a state to change the scene ("Yes" at Step S101), the control section 11 determines an initial screen (an initial screen shown at the time of start of the game, or an initial screen shown at the time of change in the scene) in accordance with the control program (Step S102). In this case, various data such as image data used for the game and characters are stored in the storage medium 70. At Step S102, an initial display position of the player character in an initial screen or a scene after a scene change (for example, a new stage in the RPG), a non-player character or non-player characters to be displayed, an initial display position of each of the non-player characters to be displayed and the like are determined in accordance with the control program.

Subsequently, the control section 11 determines a viewpoint position of a virtual camera, a direction of a visual axis, and a size of a visual angle in accordance with the control program. The control section 11 then carries out an initial setup for the virtual camera to execute a perspective transformation (Step S103). Then, the processing flow proceeds to Step S118.

On the other hand, in the case where it is determined that the game is executed, and it is not time to change the scene ("No" at Step S101), the control section 11 receives instruction data in accordance with the operation of the keypad 30 by the player (Step S104). Namely, the control section 11 determines whether instruction data for executing movement of the player character or the like is inputted from the keypad 30 via the input interface section 21. In the case where effective instruction data (that is, it means that such effective instruction data is instruction data that is allowed to be received by the control section 11) is inputted, the control section 11 receives the effective instruction data.

In the case where the control section 11 receives instruction data for instructing an action of the player character relating to the movement of the player character (that is, movement instruction data: movement instruction by a movement command or the cross key (directional instruction key)) in accordance with the operation of the keypad 30 regarding the movement of the player character (movement operation) at Step S104 ("Yes" at Step S105), the control section 11 executes a movement process in accordance with the movement instruction data thus received (Step S106). In the movement process, the control section 11 moves the position of the player character in a virtual space (on the present field) in accordance with the received movement instruction data. In this regard, such a movement command may include a dash instruction command, for example. The dash instruction command is a command to move the player character quickly, and a command for supplying an instruction that the player character goes away (or runs away) from a battle area quickly if the player character is in a melee, for example.

Subsequently, the control section 11 generates movement information on the basis of the position information of the player character derived along with the movement process (Step S107). Namely, in accordance with the movement of the position of the player character by means of the movement process, the control section 11 updates necessary data among data on the viewpoint position of the virtual camera, data on the direction of a visual axis, and data on the size of a visual angle, and changes the setting content of the virtual camera. The movement information includes various kinds of information on the movement such as the viewpoint position of the virtual camera, the direction of the visual axis, and the size of the visual angle changed along with the position of the player character after the movement and the movement of the player character. Then, the processing flow proceeds to Step S116.

In the case where the control section 11 receives instruction data for instructing a normally selectable action for the player character (that is, a normal action specifying command: a normal command) in accordance with the operation of the keypad 30 by the player for instructing the normally selectable action of the player character (a normal action specifying command selecting operation) at Step S104 ("Yes" at Step S108), the control section 11 executes an action process (a normal action process) of the player character in accordance with the received normal action specifying command (Step S109). In the normal action process, in the case where a battle is executed in accordance with the normal action specifying command for specifying a normal action (such as "battle" and "magic"), the control section 11 executes, for example, a process to determine a battle result and/or battle development between an enemy character to be a non-player character to battle against and the player character and the like.

Subsequently, the control section 11 generates normal action information on the basis of the action result and/or action development determined by means of the normal action process (Step S110). Namely, in accordance with the action result and/or the action development, for example, a battle result and/or battle development by the normal action process, the control section 11 updates and sets necessary information. The set information may include, for example, the name of the player character who battles an enemy character in the battle process, the name of the enemy character, battle development information, battle result information, a parameter (or parameters) that defines the ability (or abilities) of the player character, and the like. The normal action information includes various kinds of information on the normal action such as the name of the player character who battles an enemy character, for example, by the normal action, the name of the enemy character, battle development, battle result thereof, and a parameter that defines the ability of the player character. Then, the processing flow proceeds to Step S116.

In the case where the control section 11 receives instruction data for instructing a locally selectable action (local action) of the player character (that is, a local action specifying command: a reaction command) at Step S111 in accordance with an operation of the keypad 30 by the player for instructing the locally selectable action of the player character (a local action specifying command selecting operation) at Step S104 ("Yes" at Step S111), the control section 11 executes an action process (a local action process) of the player character in accordance with the received local action specifying command (Step S112). In the local action process, a process to determine a result and/or development of the action (for example, a conversation between characters, a jumping action, a purchase action, a pick up action, and the like) that is executed in accordance with the local action specifying command for specifying a local action such as "talk" and "jump", for example, is executed.

Subsequently, the control section 11 generates local action information on the basis of the action result and/or action development determined by means of the local action process (Step S113). Namely, in accordance with the action result and/or the action development, for example, a battle result and/or battle development by the normal action process, the control section 11 updates and sets necessary information for the action result and/or the action development at the local action process. The set information includes, for example, the name of the character whom the player character talks with, the conversation development, a conversation result, a parameter that defines the ability of the player character, and the like. The local action information includes various kinds of information on the local action such as the name of the character whom the player character talks with by the local action, the conversation development, the conversation result, and a parameter that defines the ability of the player character. Then, the processing flow proceeds to Step S116.

In the case where the control section 11 receives instruction data for other instructions (that is, other instruction data other than local or normal action instruction data, an other command) in accordance with the operation of the keypad 30 for executing other instruction (other operation) at Step S104 ("No" at Step S105. "No" at Step S108, "No" at Step Sill and "Yes" at Step S114), the control section 11 executes a process in accordance with the other instruction data thus received (Step S115). The other information corresponding to the process result at Step S115 is then generated, and the processing flow proceeds to Step S116.

The control section 11 updates the current position of the player character by storing the movement information generated at Step S107 in a predetermined data area of the RAM 12 at Step S116. Further, the control section 11 memorizes and stores various action histories of the player character by storing the normal action information generated at Step S110, the local action information generated at Step S113 and the other information generated after Step S115 in a predetermined data area of the RAM 12 at Step S116.

Subsequently, the control section 11 executes an action estimate process on the basis of information indicating the action histories of the player character once stored in the RAM 12 (Step S117). More specifically, information required to be digitized is digitized using conversion tables prepared in advance, and with respect to information required to be weighted, a score is calculated by multiplying predetermined numerical values and summing these multiplied numerical values. The calculated score is added to a previous score stored in a predetermined data area of the RAM 12, and the added score is again stored in the predetermined data area, by which the score is updated as estimate information.

Subsequently, the control section 11 determines the content of local action related information regarding the local action, for example, whether the local action specifying command is displayed or not, which local action specifying command is displayed among the multiple prepared local action specifying commands, and what is an action target (a reaction target) executed in accordance with designation (specification) of the local action specifying command to be displayed (Step S118).

Then, the control section 11 perspectively transforms the virtual three-dimensional space including the player character P and the non-player characters to be displayed from the virtual camera onto the virtual screen in accordance with setting content of the virtual camera. The control section 11 then carries out a display process to generate a two-dimensional image to be displayed on the image display screen 51 (Step S119). At Step S119, in accordance with the content determined at Step S118, the control section 11 and the graphics controller 15 carry out a display process so that a display of the local action specifying command, a display of identification of the action target to be able to distinguish the reaction target, and the like are included in the two-dimensional image to be displayed on the image display screen 51. When the display process is terminated, this main process is also terminated. Then, when a timer interruption is generated at the start of a next frame period, a next main process is carried out repeatedly. By repeatedly carrying out the main process, a character image is switched every frame period, and a moving image (animation) is resultantly displayed on the image display screen 51.

Now, the display process at Step S119 will be simply described. At Step S119, the control section 11 first transforms at least the coordinates of the vertexes of respective polygons included within a range to be perspectively transformed on the virtual screen among the coordinates of the vertexes of polygons constituting the virtual three-dimensional space in which the player character P and the three-dimensional non-player characters are included from the coordinates of the world coordinate system to the coordinates of the viewpoint coordinate system. Subsequently, the control section 11 transmits the coordinates of the vertexes of polygons of the player character P and the non-player characters in the viewpoint coordinate system to the graphics processor 15, thereby outputting a drawing or graphics to the graphics processor 15.

When the drawing or graphics is input to the graphics processor 15, the graphics processor is updates, on the basis of the coordinates of the viewpoint coordinate system, the content of the Z buffer so that data on the points that reside at the front side are retained with respect to points constituting each surface. When the content of the Z buffer is updated, the graphics processor 15 develops image data on the points that reside at the front side on the frame memory 19. Moreover, the graphics processor 15 carries out some processes such as a shading process and a texture mapping process with respect to the developed image data.

Then, the graphics processor 15 in turn reads out the image data developed on the frame memory 19, and generates video signals by adding a sync signal to the image data to output the video signals to the display device 50. The display device 50 displays an image corresponding to the video signals output from the graphics processor 15 on the image display screen 51. By switching images displayed on the image display screen 51 every single frame period, the player can see images including the state in which the player character and/or the non-player characters are moved on the field.

Figure 3:
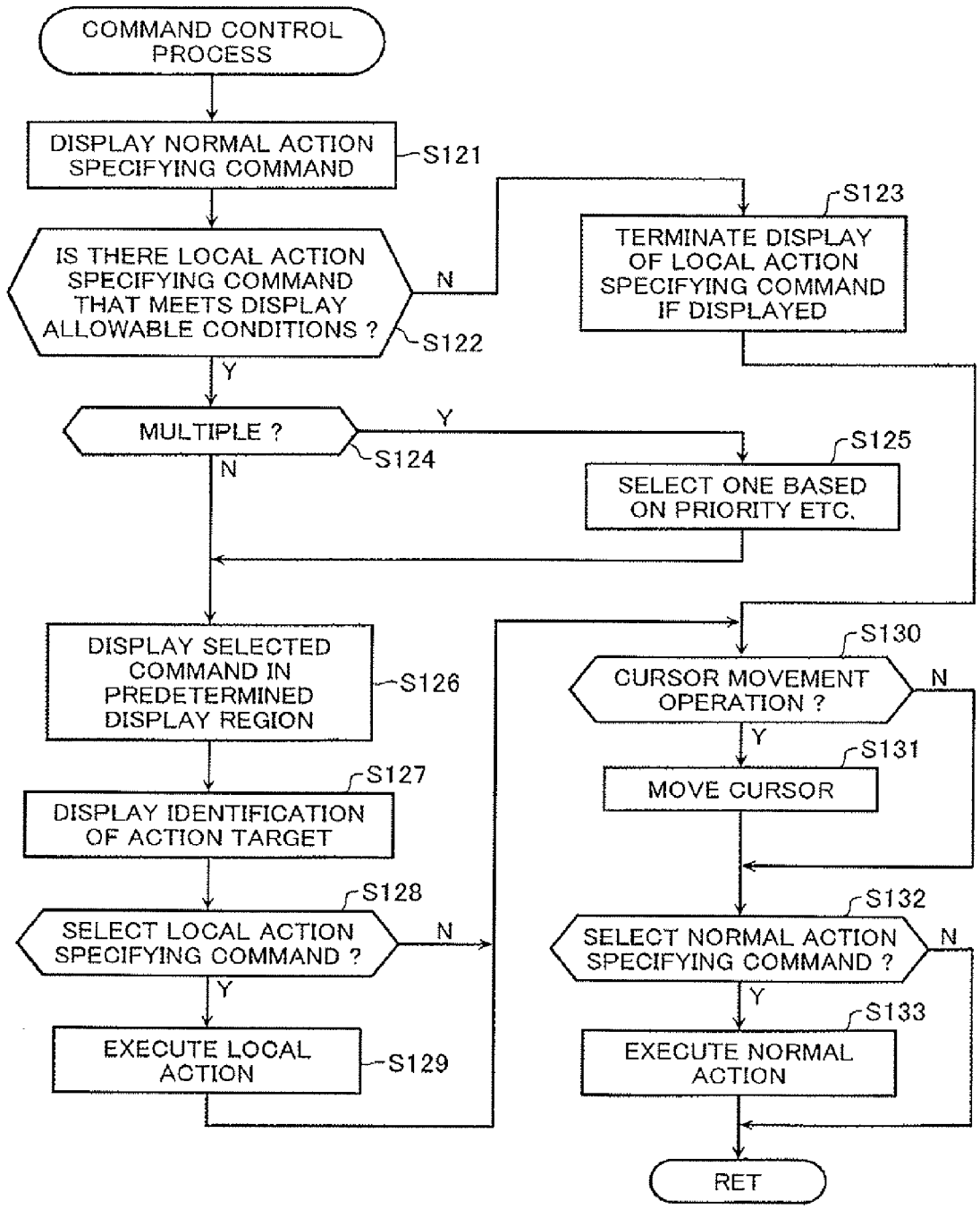
FIG. 3 is a flowchart that illustrates an example of a command control process.

Next, a local action specifying command process executed by the video game apparatus 100 of the present embodiment will be described. FIG. 3 is a flowchart that illustrates an example of a command control process executed by the video game apparatus 100 of the present embodiment.

Here, the "normal action specifying command" and the "local action specifying command" will be explained. The "normal action specifying command" is an action specifying command for specifying a normal action that the player character can normally carry out. Namely, the "normal action specifying command" is an action specifying command that is normally selectable in the field where the player character is positioned. More specifically, it is a command for specifying an action such as "battle", "magic" and "item" that the player character can always carry out. In this regard, for example, in the case where the "battle" is selected, a concrete battle method (for example, "attack with a sword", and "attack with whip") can be selected. Such a command (that is, a command for the specific battle method) is also a "normal action specifying command". This is the same point as the "magic" and "item".

The "local action specifying command" is an action specifying command for specifying a local action that the player character can locally carry out in accordance with the state of the player character. Namely, the "local action specifying command" is an action specifying command that is selectable when the local action can be carried out in accordance with the state of the player character. More specifically, it is a command for specifying an action such as "talk", "examine", "save", "special technique" and "summon" that the player character can locally carry out.

In the command control process, the control section 11 first displays at least one normal action specifying command (Step S121). Subsequently, the control section 11 confirms the current state of the player character, and determines whether there is any local action specifying command that meets predetermined display allowable conditions or not (Step S122). The display allowable conditions are preset for each of multiple local action specifying commands so that one suitable for a scene and/or a state on the video game becomes to be selectable.

FIG. 4 is an explanatory drawing that shows an example of a display allowable conditions setting table. The display allowable conditions includes "a non-player character that is an action target is positioned within a predetermined distance from the player character", and "the player character becomes a predetermined state".

At Step S122, the control section 11 determines whether there is any local action specifying command that meets the display allowable conditions or not using the display allowable conditions setting table. For example, in the case where a signboard or the like that is an action target exists within a distance B from the position of the player character, it is determined that a command 2 for specifying an action to read the signboard or the like is a local action specifying command that meets the display allowable conditions.

In the case where there is no local action specifying command that meets the display allowable conditions, the control section 11 terminates the display of the local action specifying command when the local action specifying command is being currently displayed (Step S123). Then, the processing flow proceeds to Step S130.

On the other hand, in the case where there is any local action specifying command that meets the display allowable conditions, the control section 11 determines whether there are multiple local action specifying commands that meet the display allowable conditions or not (Step S124). In the case where it is determined that there are multiple local action specifying commands, the control section 11 selects one local action specifying command on the basis of the predetermined degrees of priority (display priority) or the like (Step S125).

FIG. 5 is an explanatory drawing that shows an example of a priority setting table in which the degrees of priority for selecting any of the local action specifying commands are set. As shown in FIG. 5, the priority setting table is a table in which each of the local action specifying commands are divided (or assigned) to any one of multiple levels of the degree of priority. At Step S125, the local action specifying command having the highest degree of priority is selected using the priority setting table. In the case where two or more local action specifying commands have the same degree of priority, one local action specifying command may be selected in accordance with predetermined rules that, for example, the local action specifying command that first meets the display allowable conditions is selected. The degree of priority is set, for example, so that the higher frequency in use a local action specifying command has, the higher degree of priority the local action specifying command has. In this regard, the method of determining the degree of priority is not limited thereto, as those skilled in the art will readily appreciate, and it may be any other method that performs the same function without departing from the scope or spirit of the invention.

Further, at Step S125, in the case where a character (reaction target) to be a target of the local action carried out by means of specification (designation) of the local action specifying command is the same as a character (lock-on character) to be a target of the normal action carried out by means of specification (designation) of the normal action specifying command, the local action specifying command may be selected in priority to the other local action specifying commands. By selecting the local action specifying command having the same target as the normal action specifying command in priority to the other local action specifying commands in this manner, it is possible to selectably display the local action specifying command to specify the action against the target in priority to the other local action specifying commands, for example, in the case where the player character battles the target (target character). Thus, it is possible to make the player specify an appropriate local action specifying command.

In the case where there is only one local action specifying command that meets the display allowable conditions, the control section 11 displays the local action specifying command in a predetermined display region (Step S126). Alternatively, in the case where there are some local action specifying commands that meet the display allowable conditions, the control section 11 displays the one local action specifying command selected at Step S124 in a predetermined display region (Step S126).

Further, the control section 11 displays identification of an action target (so as to distinguish the action target) when the local action specifying command displayed at Step S126 is specified (Step S127).

In response to operation of the keypad 30 for specifying the local action specifying command (that is, local action specifying command selecting operation) (Step S128), the control section 11 controls the video game apparatus main body 10 so that the player character carries out the local action in accordance with the local action specifying command thus specified (Step S129).

Further, when operation of the keypad 30 for changing the normal action specifying commands to be selected (cursor movement operation) is carried out (Step S130), the control section 11 executes control to move the cursor in response to the operation (Step S131).

Moreover, in response to operation of the keypad 30 for specifying any one normal action specifying command (that is, normal action specifying command selecting operation) (Step S132), the control section 11 controls the video game apparatus main body 10 so that the player character carries out the normal action in accordance with the normal action specifying command thus specified (Step S133).

By controlling the video game apparatus main body 10 as described above, it is possible to display a selectable local action specifying command at an appropriate scene during progress of the video game, and this makes the local action specifying command receivable (or acceptable). Further, it is possible to make the local action specifying command receivable in a state that selection of any normal action specifying command can be received.

Next, one concrete example of a display state of the local action specifying command will be described with reference to FIGS. 6 to 8.

Figure 6:
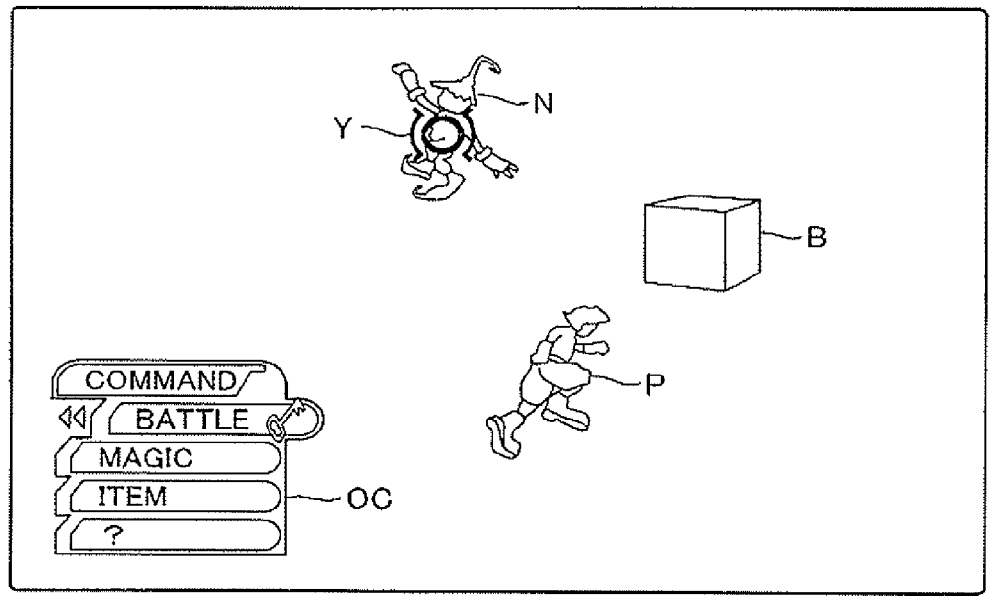
FIG. 6 is an explanatory drawing that illustrates an example of an image in which normal action specifying commands are displayed.

FIG. 6 is an explanatory drawing that illustrates an example of an image in which only normal action specifying commands are displayed without displaying a local action specifying command. FIGS. 7 and 8 are explanatory drawings, each of which illustrates an example of an image in which both normal action specifying commands and a local action specifying command are displayed.

A player character P, a non-player character N, a box B and multiple selectable normal action specifying commands OC are displayed in FIG. 6. Further, a lock-on display Y indicating that the non-player character N is locked as an action target of a predetermined normal action specifying command (for example, a normal action specifying command regarding battle) is also displayed in FIG. 6.

Figure 7:
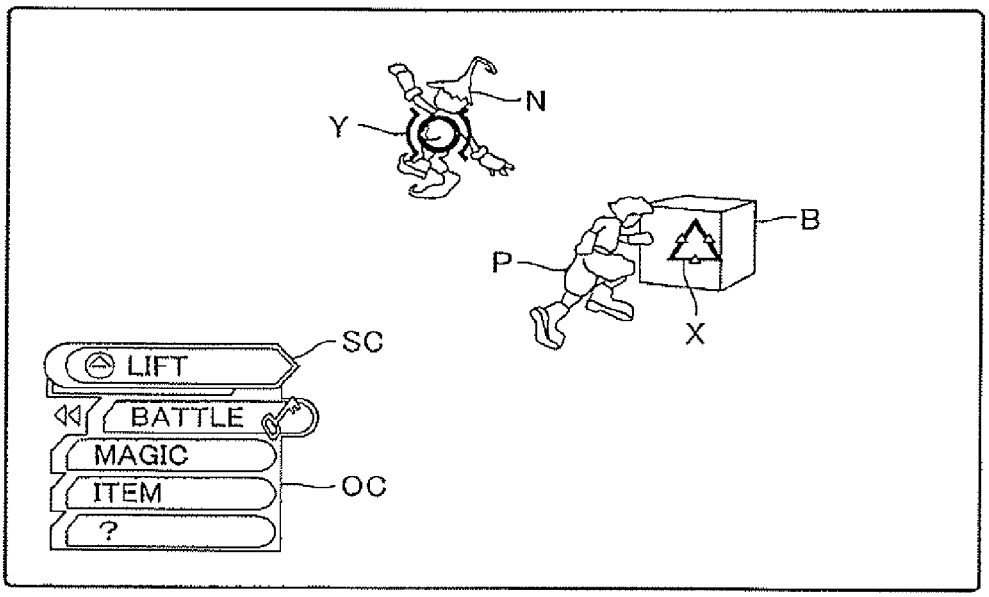
FIG. 7 is an explanatory drawing that illustrates an example of an image in which normal action specifying commands and a local action specifying command are displayed.

In a display state shown in FIG. 6, when the player character P approaches the box B on the basis of operation of the keypad 30 by the player and the display allowable conditions (for example, the distance between the player character P and the box B is within a predetermined distance) are met (see "Yes" at Step S122), as shown in FIG. 7, a local action specifying command SC for specifying "lift" that corresponds to the met display allowable conditions is displayed (see FIG. 12b). Further, at this time, an action target identifying display X to be able to distinguish the box B as an action target when the local action specifying command SC is to be specified is displayed (see Step S127). The action target identifying display X is displayed at the position (display position) where the box B as the action target is displayed or in the vicinity of the display position.

Figure 8:
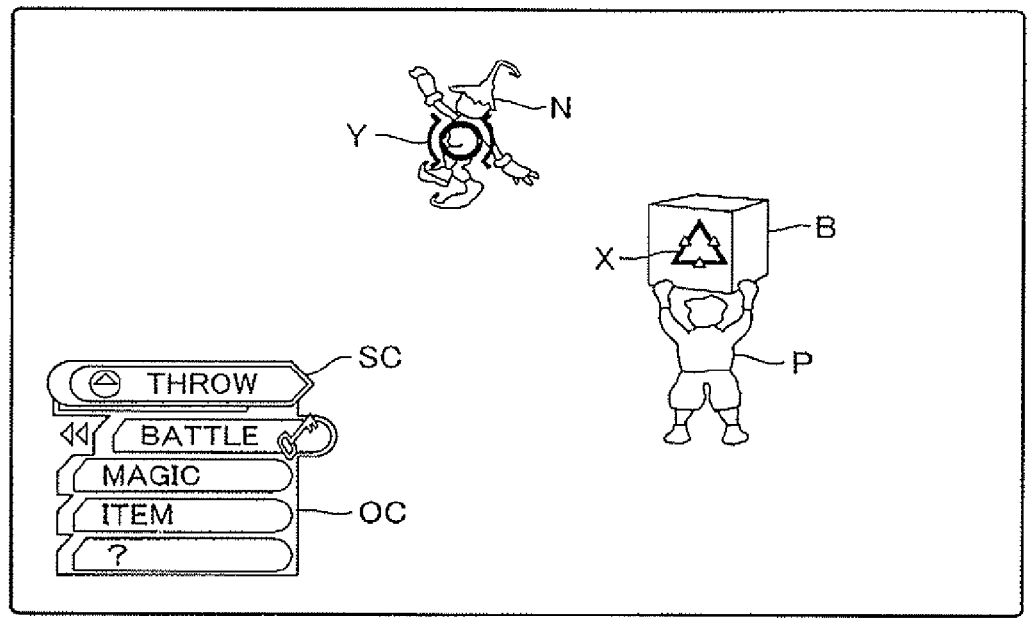
FIG. 8 is an explanatory drawing that illustrates another example of an image in which normal action specifying commands and another local action specifying command are displayed.

In the case where the player operates or manipulates, for example, the controller, to press the triangle button 32c of the keypad 30 when the local action specifying command SC is displayed as shown in FIG. 7, selection of the local action specifying command SC is received, and as shown in FIG. 8, the player character P carries out an action "lift" that the local action specifying command SC indicates. In the present embodiment, when the player character P carries out the action "lift" that the local action specifying command SC indicates, another display allowable conditions (for example, the player character P lift anything) are met (see "Yes" at Step S122). Then, as shown in FIG. 8, another local action specifying command SC for specifying "throw" that corresponds to the met display allowable conditions is displayed (see FIG. 12b). Further, at this time, an action target identifying display X to be able to distinguish the box B as an action target when the local action specifying command SC is to be specified is displayed (see Step S127).

In this regard, in this example, the action target when the local action specifying command SC is specified is changed to the non-player character N that is locked as an action target of a predetermined normal action specifying command, and an action target identifying display X to be able to distinguish the non-player character N as the action target may be displayed (see Step S127). Namely, an action target (reaction target) when a local action specifying command SC is specified may be changed to a non-player character (lock-on target) that is locked by the local action specifying command SC. Whether such a change process is carried out or not may be determined on the basis of, for example, whether the local action specifying command SC is a process that can be carried out against a non-player character N that is locked by the local action specifying command SC such as "throw" and "special attack" or not.

In the case where the player operates or manipulates, for example, the controller, to press the triangle button 32c of the keypad 30 when the local action specifying command SC is displayed as shown in FIG. 8, selection of the local action specifying command SC is received, and the player character P carries out an action "throw" that the local action specifying command SC indicates. This action "throw" is an action to throw the box B. In the case where the action target is set to the non-player character N, the player character P carries out the action to throw the box B toward the non-player character N.

Next, another concrete example of a display state of the local action specifying command will be described with reference to FIGS. 9 and 10.

Figure 9:
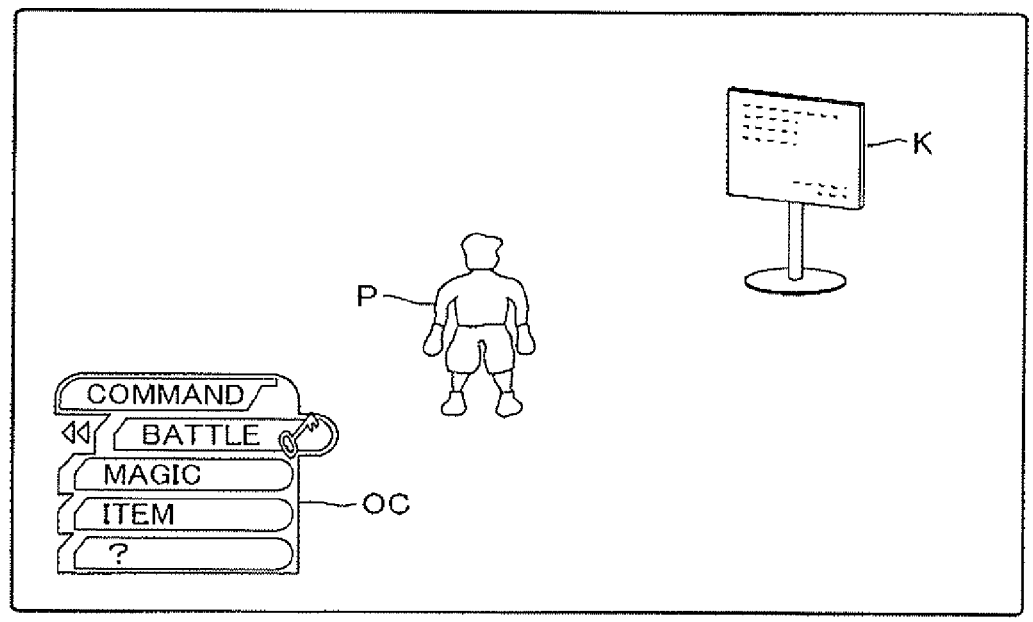
FIG. 9 is an explanatory drawing that illustrates another example of an image in which normal action specifying commands are displayed.

FIG. 9 is an explanatory drawing that illustrates another example of an image in which only normal action specifying commands are displayed without displaying a local action specifying command. FIG. 10 is an explanatory drawing that illustrates another example of an image in which both normal action specifying commands and another local action specifying command are displayed.

A player character P, a signboard K, and multiple selectable normal action specifying commands OC are displayed in FIG. 9. In a display state shown in FIG. 9, when the player character P approaches the signboard K on the basis of operation of the keypad 30 by the player and the display allowable conditions (for example, the distance between the player character P and the signboard K is within a predetermined distance) are met (see "Yes" at Step S122), as shown in FIG. 10, a local action specifying command SC for specifying "read" that corresponds to the met display allowable conditions is displayed (see FIG. 12b). Further, at this time, an action target identifying display X to be able to distinguish the signboard K as an action target when the local action specifying command SC is to be specified is displayed (see Step S127). The action target identifying display X is displayed at the position (display position) where the signboard K as the action target is displayed or in the vicinity of the display position.

Figure 10:
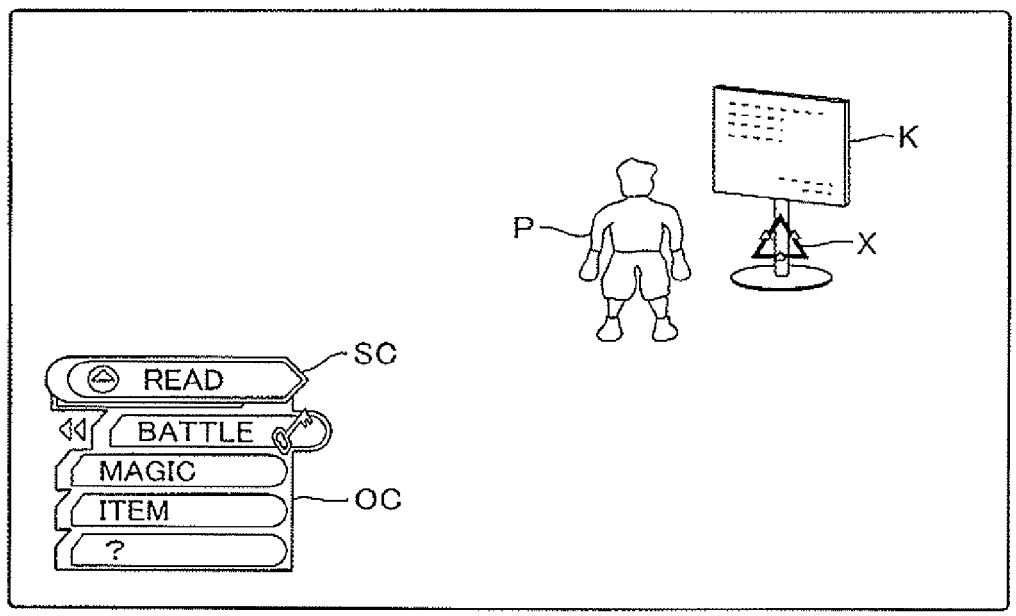
FIG. 10 is an explanatory drawing that illustrates still another example of an image in which normal action specifying commands and still another local action specifying command are displayed.

In the case where the player operates or manipulates, for example, the controller, to press the triangle button 32c of the keypad 30 when the local action specifying command SC is displayed as shown in FIG. 10, selection of the local action specifying command SC is received, and the player character P carries out an action "read" that the local action specifying command SC indicates. Namely, the player character P carries out an action to read letters posted on the signboard K that is the action target.

Next, still another concrete example of a display state of the local action specifying command will be described with reference to FIGS. 11 and 12.

Figure 11:
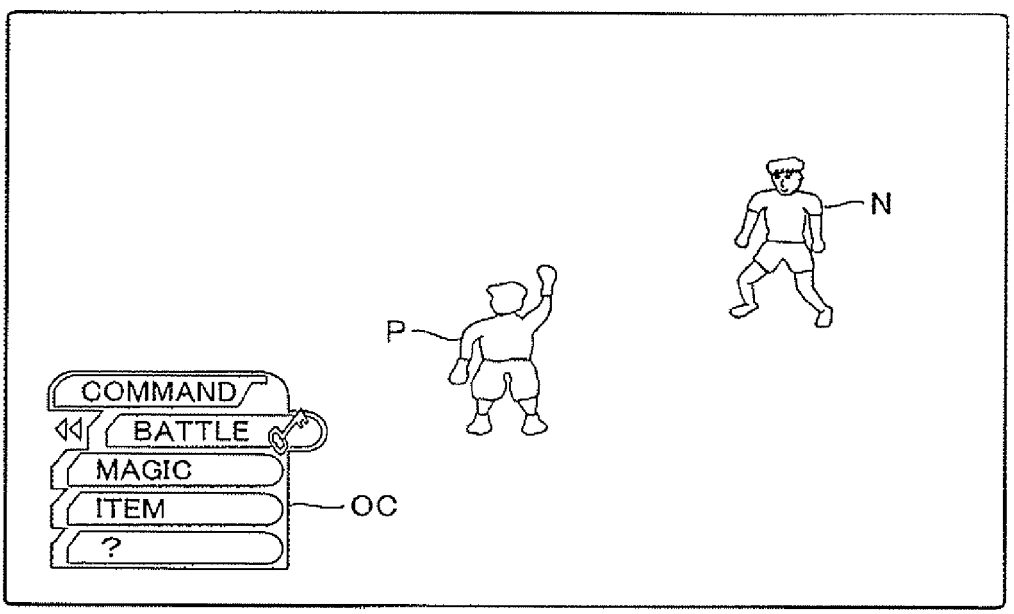
FIG. 11 is an explanatory drawing that illustrates still another example of an image in which normal action specifying commands are displayed.

FIG. 11 is an explanatory drawing that illustrates still another example of an image in which only normal action specifying commands are displayed without displaying a local action specifying command. FIG. 12 is an explanatory drawing that illustrates still another example of an image in which both normal action specifying commands and still another local action specifying command are displayed.

A player character P, a non-player character N and multiple selectable normal action specifying commands OC are displayed in FIG. 11. In a display state shown in FIG. 11, when the player character P approaches the non-player character N on the basis of operation of the keypad 30 by the player and the display allowable conditions (for example, the distance between the player character P and the non-player character N is within a predetermined distance) are met (see "Yes" at Step S122), as shown in FIG. 12, a local action specifying command SC for specifying "talk" that corresponds to the met display allowable conditions is displayed (see FIG. 126). Further, at this time, an action target identifying display X to be able to distinguish the non-player character N as an action target when the local action specifying command SC is to be specified is displayed (see Step S127). The action target identifying display X is displayed at the position (display position) where the non-player character N as the action target is displayed or in the vicinity of the display position.

Figure 12:
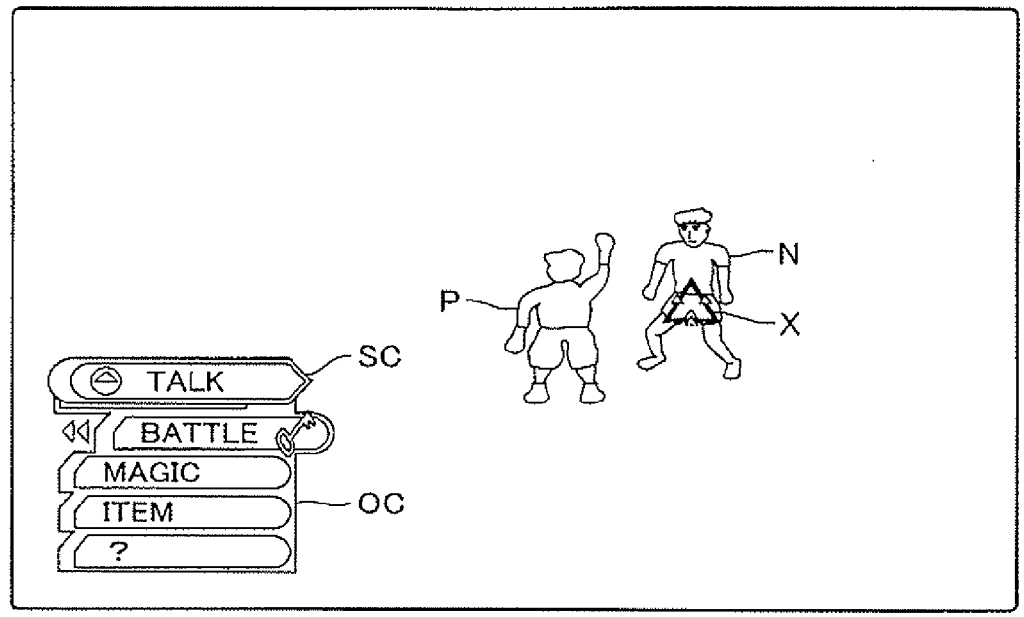
FIG. 12 is an explanatory drawing that illustrates yet another example of an image in which normal action specifying commands and yet another local action specifying command are displayed.

In the case where the player operates to press the triangle button 32c of the keypad 30 when the local action specifying command SC is displayed as shown in FIG. 12, selection of the local action specifying command SC is received, and the player character P carries out an action "talk" that the local action specifying command SC indicates.

Next, yet still another concrete example of a display state of the local action specifying command will be described with reference to FIGS. 13 and 14.

Figure 13:
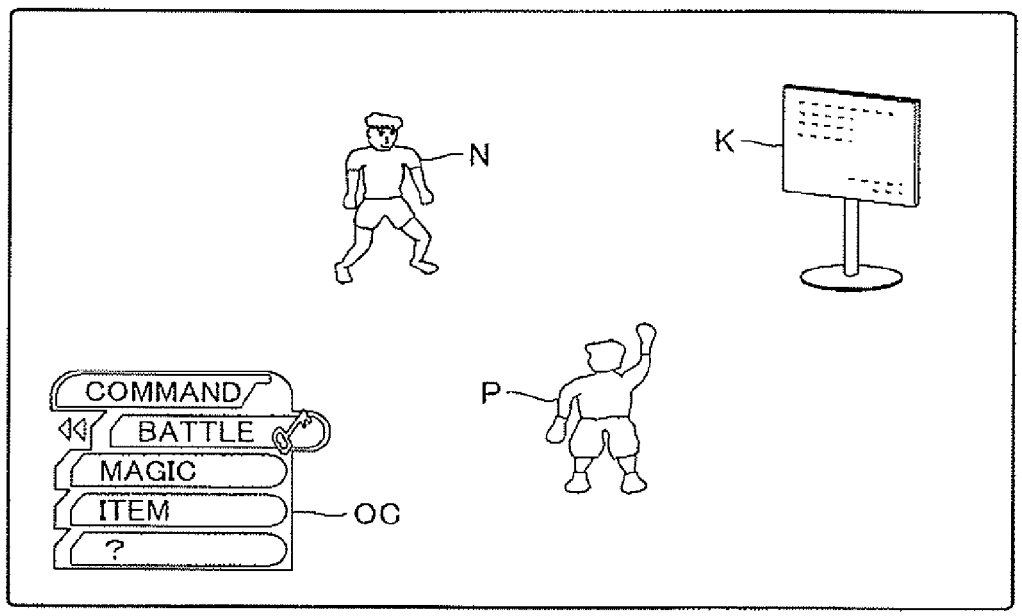
FIG. 13 is an explanatory drawing that illustrates yet another example of an image in which normal action specifying commands are displayed.

FIG. 13 is an explanatory drawing that illustrates yet still another example of an image in which only normal action specifying commands are displayed without displaying a local action specifying command. FIG. 14 is an explanatory drawing that illustrates yet still another example of an image in which both normal action specifying commands and a still another local action specifying command are displayed.

A player character P, a non-player character N, a signboard K, and multiple selectable normal action specifying commands OC are displayed in FIG. 13. In a display state shown in FIG. 13, when the player character P approaches the non-player character N and the signboard K on the basis of operation of the keypad 30 by the player and the two kinds of display allowable conditions (for example, the distance between the player character P and the non-player character N is within a predetermined distance, and the distance between the player character P and the signboard K is within a predetermined distance) are met (see "Yes" at Step S122 and "Yes" at Step S124), it is determined to give priority to one of "talk" and "read" in accordance with the degrees of priority and the like (see Step S125). As shown in FIG. 14, for example, a local action specifying command SC for specifying "talk" is determined to be given priority and is displayed (see Step S126). Further, at this time, an action target identifying display X to be able to distinguish the non-player character N as an action target when the local action specifying command SC is to be specified is displayed (see Step S127). The action target identifying display X is displayed at the position (display position) where the non-player character N as the action target is displayed or in the vicinity of the display position.

Figure 14:
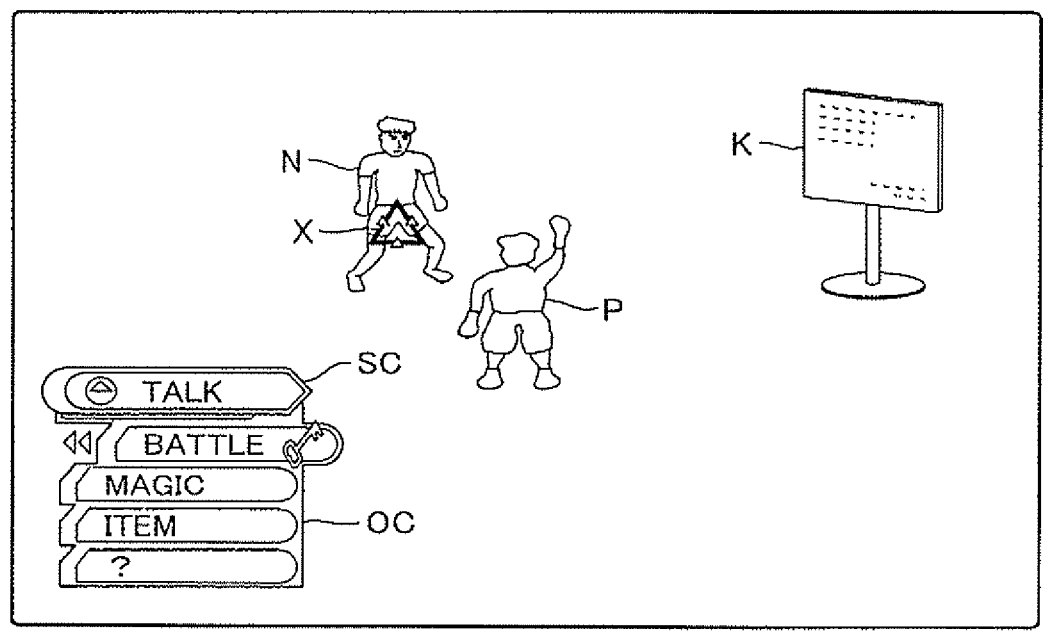
FIG. 14 is an explanatory drawing that illustrates yet still another example of an image in which normal action specifying commands and yet still another local action specifying command are displayed.

In the case where the player operates to press the triangle button 32c of the keypad 30 when the local action specifying command SC is displayed as shown in FIG. 14, selection of the local action specifying command SC is received, and the player character P carries out an action "talk" that the local action specifying command SC indicates.

As explained above, in the embodiment described above, the video game apparatus is constructed so that a local action specifying command corresponds to the state of the player character (for example, the state that the display allowable conditions indicates) and the local action specifying command is selectably displayed when the player character becomes the corresponding state. Thus, it is possible to display the local action specifying command for specifying an action (local action) when the action that can locally be carried out becomes practicable (or executable). This makes it possible to easily select, through a simple operation by a player, a normal action specifying command that is normally selectable or a local action specifying command for specifying an appropriate action in accordance with the state of the player character.

Further, in the embodiment described above, the video game apparatus is constructed so that the states of the player character respectively correspond to multiple categories of local action specifying commands and the local action specifying command that corresponds to the current state of the player character is selectably displayed among the multiple categories of local action specifying commands. Thus, it is possible to easily select a local action specifying command for specifying an appropriate action in accordance with the state of the player character.

Moreover, in the embodiment described above, the video game apparatus is constructed so that a degree of priority is set to each of the multiple categories of local action specifying commands and the local action specifying command having the highest degree of priority is selectably displayed in the case where there are multiple local action specifying commands that corresponds to the current state of the player character. Thus, it is possible to easily select a local action specifying command for specifying an appropriate action in accordance with the state of the player character.

Furthermore, in the embodiment described above, the video game apparatus is constructed so that identification of the action target is displayed in order to be able to identify a target character that is a target of an action of the player character in the case where the local action specifying command to be selectably displayed is selected. Thus, it is possible to easily identify the target character that is the target of the action of the player character.

Further, in the embodiment described above, the video game apparatus is constructed so that selection of a normal action specifying command is received in accordance with an output of a first operation signal from the keypad 30 (for example, an operation signal in response to press of the circle button by a player) and selection of a local action specifying command is received in response to an output of a second operation signal that is different from the first operation signal from the keypad 30 (for example, an operation signal in response to press of the triangle button by a player). Thus, it is possible to carry out, through a simple operation by a player, selection of the normal action specifying command that is normally selectable and selection of the local action specifying command for specifying an appropriate action in accordance with the current state of the player character.

In this regard, although it is not particularly referred to in the embodiment described above, for example, a local action specifying command may be controlled as follows. Namely, in the case where the player character becomes (enters) a battle state, while a local action specifying command unrelated to the battle is displayed, the local action specifying command is, for example, highlighted, and may be controlled so as to become impossible to select.

Moreover, although the video game apparatus main body 10 and the display device 50 are constructed from separate components in the embodiment described above, the display device 50 may be incorporated in the video game apparatus main body 10, as will be readily apparent to those skilled in the art, without departing from the scope of spirit of the invention.

Furthermore, although the game control for the RPG has been explained in the embodiment described above, the technique of the present invention can be applied to other kinds of video games appropriately, as will be readily apparent to those skilled in the art, without departing from the scope of spirit of the invention.

Further, although it has been explained with the video game apparatus 100 as an example in the embodiment described above, the present invention is not limited thereto. The present invention can be applied to various apparatuses such as a personal computer, a cellular phone terminal, a portable game apparatus and the like as long as such an apparatus has an image generating function. In this regard, in the case where the present invention is applied to a portable game apparatus or the like, a small-sized storage medium such as a semiconductor memory card may be used as the storage medium 70 described above in place of a CD-ROM or DVD-ROM, or any other type of storage medium as those skilled in the art will appreciate without departing from the scope or spirit of the invention.

Moreover, in the embodiment described above, although it has been described that game data for causing the video game apparatus main body 10 (video game apparatus 100) to carry out various processes described above (that is, various data such as control program data used for the game) are stored in the storage medium 70, the game data may be delivered by a server apparatus such as a network server (WWW server), or other computer device connected (either wired or wireless) to a network, such as the Internet, a local area network, a wide area network, or the like, or any combination thereof. In this case, the video game apparatus main body 10 may obtain the game data delivered by the server apparatus via the communication network 80, and store the game data in the HDD 13. The game data may be used by being loaded on the RAM 12 from the HDD 13. In this regard, although the game data are explained in the above example, such data may include at least control program data for causing a computer to carry out the image generating process in the embodiment as described above.

The present invention can be applied to a video game machine, a personal computer, a cellular phone terminal, a portable game apparatus or the like, or any combination thereof that causes an image display apparatus to display a player character on an image display screen, and controls progress of a video game by controlling an action of the player character displayed on the image display screen in response to an operation by a player. Therefore, the present invention is useful.

The illustrations of the embodiments described herein are intended to provide a general understanding of the structure of the various embodiments. The illustrations are not intended to serve as a complete description of all of the elements and features of apparatuses and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope and spirit of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments that fall within the true spirit and scope of the present disclosure. Thus, to the maximum extent allowed by law, the scope of the invention is to be determined by the broadest permissible interpretation of the following claims and their equivalents, and shall not be restricted or limited by the foregoing detailed description.

Although several exemplary embodiments have been described, it is understood that the words that have been used are words of description and illustration, rather than words of limitation. Changes may be made within the purview of the appended claims, as presently stated and as amended, without departing from the scope and spirit of the invention in its aspects. Although the description refers to particular means, materials and embodiments, the invention is not intended to be limited to the particulars disclosed, but rather extends to all functionally equivalent structures, methods, and uses such as are within the scope of the appended claims.

What is claimed is:

1. A video game processing apparatus that causes an image of a player character of a video game to be displayed, the video game processing apparatus including a memory, a processor, and an input interface and controlling a progress of the video game by controlling an action of the displayed player character in accordance with an operation by a player, the displayed player character transitioning between a plurality of states in accordance with the operation by the player during the progress of the video game, each of the states corresponding to a display allowable condition, the video game processing apparatus comprising:

a normal action specifying command display controller, stored in the memory and executed by the processor, that selectably displays at least one normal action specifying command for specifying a normal action that the player character can perform, the normal action being performable by the player in each of the states;

a state determiner, stored in the memory and executed by the processor, that determines, from among the plurality of states, a current state of the player character, the current state being determined based on the action of the player character during the progress of the video game;

a local category determiner, stored in the memory and executed by the processor, that determines, from among a plurality of categories of local action specifying commands, one of the categories of local action specifying commands that corresponds to the determined current state of the player character, each of the categories of local action specifying commands corresponding to less than all of the states;

a local action specifying command display controller, stored in the memory and executed by the processor, that selectably displays at least one local action specifying command associated with the one of the categories of local action specifying commands determined to correspond to the current state of the player character, the local action specifying command specifying a local action that the player character can perform in response to the player character being in the current state and the local action specifying command being performable in less than all of the states;

a command selection receiver that receives, via the input interface, a command, the command indicating, in accordance with the operation of the player, one of the displayed normal action specifying command and the displayed local action specifying command; and a player character action controller, stored in the memory and executed by the processor, that controls an action of the player character in response to the command received, via the input interface, by the command selection receiver, wherein the current state of the player character becomes another one of the states in response to the player character carrying out the local action in response to the command selection receiver receiving the command that selects the displayed local action specifying command, wherein the local action specifying command display controller displays another local action specifying command in response to the current state becoming the another one of the states, the another local action specifying command being specified by the selected local action specifying command and being performable by the player in the another one of the states, and wherein, when a plurality of local action specifying commands correspond to the current state of the player character, the local action specifying command display controller displays one of the plurality of local action specifying commands having a highest degree of priority in priority to an other of the plurality of local action specifying commands, and, when multiple ones of the plurality of local action specifying commands have the highest degree of priority, the local action specifying command controller displays one of the multiple ones of the plurality of local action specifying commands that specifies the local action whose target is a normal action target character in priority to an other of the multiple ones of the plurality of local action specifying commands.

2. The video game processing apparatus according to claim 1, wherein the video game processing apparatus causes at least one other character of the video game to be displayed, wherein the at least one other character comprises a target character of at least one of the normal action and the local action, and the categories of local action specifying commands correspond to a category of the target character, which is to be a target of the local action of the player character.

3. The video game processing apparatus according to claim 2, further comprising:

a normal action target identifying display controller, stored in the memory and executed by the processor, that displays identification of the normal action target character when at least one normal action specifying command is selected.

4. The video game processing apparatus according to claim 2, further comprising:

a local action target identifying display controller, stored in the memory and executed by the processor, that displays identification of a local action target character when the at least one local action specifying command is selected.

5. The video game processing apparatus according to claim 4, further comprising:

a normal action target identifying display controller, stored in the memory and executed by the processor, that displays identification of the normal action target character when the at least one normal action specifying command is selected; and a target character change controller, stored in the memory and executed by the processor, that causes the local action target character, whose identification is to be displayed by the local action target identifying display controller, to change, wherein, when the player character becomes a state that corresponds to a predetermined local action specifying command, the target character change controller changes the local action target character when the predetermined local action specifying command is selected, to the normal action target character.

6. The video game processing apparatus according to claim 2, wherein the current state of the player character includes a state where a distance between the player character and the target character is within a predetermined distance.

7. The video game processing apparatus according to claim 1, wherein the categories of the local action specifying commands correspond to categories of the states of the player character.

8. The video game processing apparatus according to claim 1, further comprising:

an operation signal output controller, stored in the memory and executed by the processor, that outputs operation signals including a first operation signal and a second operation signal, which is different from the first operation signal, to the command selection receiver in accordance with an operation of the player, wherein the command selection receiver receives selection of the at least one normal action specifying command in response to an output of the first operation signal from the operation signal output controller, and receives selection of the at least one local action specifying command in response to an output of the second operation signal from the operation signal output controller.

9. A method of processing a video game that causes a player character of a video game to be displayed, the method controlling progress of the video game by controlling an action of the displayed player character in accordance with an operation from a player, the displayed player character transitioning between a plurality of states in accordance with the operation by the player during the progress of the video game, each of the states corresponding to a display allowable condition, the method comprising:

displaying, on a display screen, at least one normal action specifying command for specifying a normal action that the player character can carry out, the normal action being performable by the player in each of the states;

determining, with a processor, from among the plurality of states, a current state of the player character, the current state being determined based on the action of the player character during the progress of the video game;

determining, with the processor, from among a plurality of categories of local action specifying commands, one of the categories of local action specifying commands that corresponds to the determined current state of the player character, each of the categories of local action specifying commands corresponding to less than all of the states;

displaying, on the display screen, at least one local action specifying command associated with the one of the categories of local action specifying commands determined to correspond to the current state of the player character, the local action specifying command specifying a local action that the player character can perform in response to the player character being in the current state and the local action specifying command being performable in less than all of the states;

receiving, via an input interface, a command selection, by an operation of the player, that selects one of the displayed normal action specifying command and the displayed local action specifying command; and controlling, with the processor, an action of the player character in response to the received command, wherein the current state of the player character becomes another one of the states in response to the player character carrying out the local action in response to the received command selection selecting the displayed local action specifying command, wherein another local action specifying command is displayed in response to the current state becoming the another one of the states, the another local action specifying command being specified by the selected local action specifying command and being performable by the player in the another one of the states, and wherein, when a plurality local action specifying commands correspond to the current state of the player character, one of the plurality of local action specifying commands having a highest degree of priority is displayed in priority to an other of the plurality of local specifying commands, and, when multiple ones of the plurality of local action specifying commands have the highest degree of priority, one of the multiple ones of the plurality of local action specifying commands that specifies the local action whose target is a normal action target character is displayed in priority to an other of the multiple ones of the plurality of local action specifying commands.

10. The method according to claim 9, wherein other characters of the video game are displayed, and each of the other characters may be a target character of at least one of the normal action and the local action, and the categories of the local action specifying commands correspond to the categories of the other characters.

11. The method according to claim 10, further comprising: displaying, on the display screen, identification of at least one of the other characters when the at least one displayed local action specifying command is selected.

12. The method according to claim 10, wherein the current state of the player character includes a state where a distance between the player character and at least one of the other characters is within a predetermined distance.

13. The method according to claim 9, wherein the categories of the local action specifying commands correspond to categories of the states of the player character.

14. The method according to claim 9, wherein receiving a command further comprises:

receiving, via the input interface, selection of the displayed at least one normal action specifying command in response to an input of a first operation signal; and receiving selection of the displayed at least one local action specifying command in response to an input of a second operation signal different from the first operation signal.

15. A non-transitory computer readable medium, comprising code segments for processing a video game, and for controlling progress of the video game by causing display of a player character, and controlling an action of the displayed player character, the displayed player character transitioning between a plurality of states during the progress of the video game, each of the states corresponding to a display allowable condition, the computer readable medium comprising:

a normal action display code segment that selectably displays at least one normal action specifying command for specifying a normal action that the player character can perform, the normal action being performable by the player in each of the states;

a state determining code segment that determines, from among the plurality of states, a current state of the player character, the current state being determined based on the action of the player character during the progress of the video game;

a local category determining code segment that determines, from among a plurality of categories of local action specifying commands, one of the categories of local action specifying commands that corresponds to the determined current state of the player character, each of the categories of local action specifying commands corresponding to less than all of the states;

a local action display code segment that displays at least one local action specifying command associated with the one of the categories of local action specifying commands determined to correspond to the current state of the player character, the local action specifying command specifying a local action that the player character can perform in response to the player character being in the current state and the local action specifying command being performable in less than all of the states;

a receiving code segment that receives a command that selects, by an operation of the player, one of the displayed normal action specifying command and the displayed local action specifying command; and a controlling code segment that controls an action of the player character in response to the received command, wherein the current state of the player character becomes another one of the states in response to the player character carrying out the local action in response to the receiving code segment receiving the command that selects the displayed local action specifying command, wherein the local action display code segment displays another local action specifying command in response to the current state becoming the another one of the states, the another local action specifying command being specified by the selected local action specifying command and being performable by the player in the another one of the states, and wherein, when a plurality of local action specifying commands correspond to the current state of the player character, the local action display code segment displays one of the plurality of local action specifying commands having a highest degree of priority in priority to an other of the plurality of local action specifying commands, and, when multiple ones of the plurality of local action specifying commands have the highest degree of priority, the local action display code segment displays one of the multiple ones of the plurality of local action specifying commands that specifies the local action whose target is a normal action target character in priority to an other of the multiple ones of the plurality of local action specifying commands.

16. The non-transitory computer readable medium according to claim 15, wherein other characters of the video game are displayed, and each of the other characters may be a target of at least one of the normal action and the local action, and the multiple categories of local action specifying commands correspond to the categories of the other characters.

17. The non-transitory computer readable medium according to claim 16, further comprising:

an identifying display code segment for displaying identification of at least one of the other characters when the at least one displayed local action specifying command is selected.

18. The non-transitory computer readable medium according to claim 16, wherein the current state of the player character includes a state where a distance between the player character and at least one of the other characters is within a predetermined distance.

19. The non-transitory computer readable medium according to claim 15, wherein the categories of the local action specifying commands correspond to categories of the states of the player character.

20. The non-transitory computer readable medium according to claim 15, further comprising:

a first operation receiving code segment for receiving selection of the displayed at least one normal action specifying command in response to an input of a first operation signal; and a second operation receiving code segment for receiving selection of the displayed at least one local action specifying command in response to an input of a second operation signal different from the first operation signal.

* * * * *